(12) United States Patent
Chen et al.

(10) Patent No.: US 10,671,379 B2
(45) Date of Patent: Jun. 2, 2020

(54) SOFTWARE GLOBALIZATION MANAGEMENT

(71) Applicant: International Business Machines Corporation, Armonk, NY (US)

(72) Inventors: Dong Chen, Beijing (CN); Zhi Li Guan, Beijing (CN); Yang Liang, Beijing (CN); Kun Yang, Beijing (CN); Ting Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/937,601

(22) Filed: Mar. 27, 2018

(65) Prior Publication Data
US 2019/0303136 A1    Oct. 3, 2019

(51) Int. Cl.
  *G06F 9/44*    (2018.01)
  *G06F 8/70*    (2018.01)
  *G06F 9/445*   (2018.01)
  *G06F 9/451*   (2018.01)

(52) U.S. Cl.
  CPC ............ *G06F 8/70* (2013.01); *G06F 9/44526* (2013.01); *G06F 9/454* (2018.02)

(58) Field of Classification Search
  CPC ......... G06F 8/70; G06F 9/44526; G06F 9/454
  USPC .................................................. 717/120, 123
  See application file for complete search history.

(56) References Cited

U.S. PATENT DOCUMENTS

| 6,507,855 | B1* | 1/2003 | Stern ..................... G06F 8/73 715/234 |
| 7,013,289 | B2* | 3/2006 | Horn .................... G06Q 10/087 705/14.51 |
| 7,681,127 | B2* | 3/2010 | Thurston .............. G06F 16/955 715/265 |
| 7,886,267 | B2  | 2/2011 | Pratt et al. |
| 7,904,595 | B2* | 3/2011 | Cheng .................... H04L 29/06 709/246 |

(Continued)

OTHER PUBLICATIONS

Scott Gu Blog, "jQuery Globalization Plugin from Microsoft", 2010, retrieved from https://weblogs.asp.net/scottgu/jquery-globalization-plugin-from-microsoft , 21 pages (Year: 2010).*

(Continued)

*Primary Examiner* — Ted T. Vo
(74) *Attorney, Agent, or Firm* — Scott S. Dobson

(57) ABSTRACT

Embodiments of the present invention provide a method, system and computer program product for software globalization management. In an embodiment of the invention, a method for software globalization management incudes loading markup in a browser for rendering in the browser and parsing the markup to identify different markup language tags disposed in the markup. Thereafter, on condition that during the parsing a globalization tag is detected, an internationalization key associated with a textual resource is extracted in connection with the globalization tag, a locale setting is retrieved for the browser, the key is submitted to remote repository with the locale setting in order to retrieve therefrom a translated form of the textual resource in accordance with the locale setting, the translated form of the textual resource is received in response to the requesting and the markup is rendered with the translated form of the textual resource.

15 Claims, 2 Drawing Sheets

(56) References Cited

U.S. PATENT DOCUMENTS

| | | | |
|---|---|---|---|
| 8,412,510 B2* | 4/2013 | Zhou | G06F 17/289 704/2 |
| 9,300,727 B2 | 3/2016 | Ongg et al. | |
| 9,442,744 B2 | 9/2016 | Lerum et al. | |
| 9,529,797 B2 | 12/2016 | Shoshan et al. | |
| 9,619,305 B2 | 4/2017 | Jiang et al. | |
| 9,798,723 B2* | 10/2017 | Rodet | G06F 9/454 |
| 2017/0039121 A1 | 2/2017 | Liu et al. | |

OTHER PUBLICATIONS

Sukesh Khare, "Globalization issues in ASP and ASP.NET", 2012, Microsoft Support, https://support.microsoft.com/en-us/help/893663/globalization-issues-in-asp-and-asp-net , 16 pages (Year: 2012).*

Microsoft Docs, "<globalization> Element", 2006, https://docs.microsoft.conn/en-us/previous-versions/dotnet/netframework-1.1/hy4kkhe0(v=vs.71) , 3 pages (Year: 2006).*

Paul Lane, "Oracle Database Globalization Support Guide", 2013, Oracle, 402 pages (Year: 2013).*

Cadieux et al., "GILT: Globalization, Internationalization, Localization, Translation", Feb. 2017, retrieved from https://web.archive.org/web/20170207162833/http://www.i18n.ca/publications/GILT.pdf , 6 pages (Year: 2017).*

Getting Started With Globalization Pipeline, IBM Cloud Docs, Sep. 2016, https://console.bluemix.net/docs/services/GlobalizationPipeline/index.html.

* cited by examiner

SOFTWARE GLOBALIZATION MANAGEMENT

BACKGROUND OF THE INVENTION

Field of the Invention

The present invention relates to the field of software globalization.

Description of the Related Art

Software internationalization and software localization when combined facilitate the distribution and utilization of a computer program across geographic and lingual boundaries. In this regard, software internationalization refers to the design of a computer program so that the program may be adapted to various languages and regions without requiring commensurate changes in the underlying implementation of the computer program. Software, localization, in turn, refers to the adaptation of the internationalized computer program for a specific region or language by adding locale-specific components and translating text. Accordingly, localization must be performed on multiple occasions, once for each different locale, whereas internationalization ideally is ideally performed only once, or as an integral part of the development of the computer program.

Software internationalization, in the context of an ordinary computer program, is viewed as an acceptable and ordinary element of the software development process in so far as, once internationalization has been achieved, further internationalization is not required absent a significant redevelopment of the source code of the computer program. As such, though a manually intensive, tedious process, often performed by individuals in a dedicated department, software publishers have not sought out a more automated and therefore more efficient solution. However, for fast evolving computer programs such as Web distributable applications, software internationalization according to the contemporary manual process poses a challenge to the speed at which a computer program is able to be released for consumption.

BRIEF SUMMARY OF THE INVENTION

Embodiments of the present invention address deficiencies of the art in respect to the internationalization of a computer program and provide a novel and non-obvious method, system and computer program product for software globalization management. In an embodiment of the invention, a method for software globalization management incudes loading markup in a browser for rendering in the browser and parsing the markup to identify different markup language tags disposed in the markup. Thereafter, on condition that during the parsing a globalization tag is detected, an internationalization key associated with a textual resource is extracted in connection with the globalization tag, a locale setting is retrieved for the browser, the key is submitted to remote repository with the locale setting in order to retrieve therefrom a translated form of the textual resource in accordance with the locale setting, the translated form of the textual resource is received in response to the requesting and the markup is rendered with the translated form of the textual resource.

In one aspect of the embodiment, the globalization tag is detected by a globalization agent coupled to the browser as a plug-in to the browser. Alternatively, the globalization tag is detected by a globalization agent in response to a call to a method exposed by an application programming interface (API) to the globalization agent. In another aspect of the embodiment, the translated form of the textual resource is retrieved from a cache coupled to the browser in lieu of the remote repository. Finally, in yet another aspect of the embodiment, the method further includes generating a utilization report in response to each request for a translated form of a textual resource.

In another embodiment of the invention, a data processing system is configured for software globalization management. The system includes a host computing system with memory and at least one processor and a Web browser executing in the memory of the host computing system. Finally, the system includes a software globalization module coupled to the Web browser. The module includes program code enabled upon execution in the memory of the host computing system to parse markup loaded in the Web browser to identify different markup language tags disposed in the markup, and on condition that during the parsing a globalization tag is detected, to extract in connection with the globalization tag, an internationalization key associated with a textual resource, retrieve a locale setting for the browser, submit the key over a computer communications network to remote repository with the locale setting in order to retrieve therefrom a translated form of the textual resource in accordance with the locale setting, receive in response to the requesting the translated form of the textual resource and direct the Web browser to render the markup with the translated form of the textual resource.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for software globalization management. In accordance with an embodiment of the invention, a browser loads markup into memory for rendering in the browser. The markup is parsed to identify a globalization tag disposed in the markup. In response to identifying a globalization tag, internationalization key to a textual resource is extracted in association with the tag and submitted to a server to retrieve a localization parameter. Thereafter, a request is transmitted to a server coupled to an internationalization repository to retrieve a translated form of the textual resource in accordance with the internationalization key and the translated form of the textual resource is received in turn from the repository and rendered in the browser.

Figure 1:
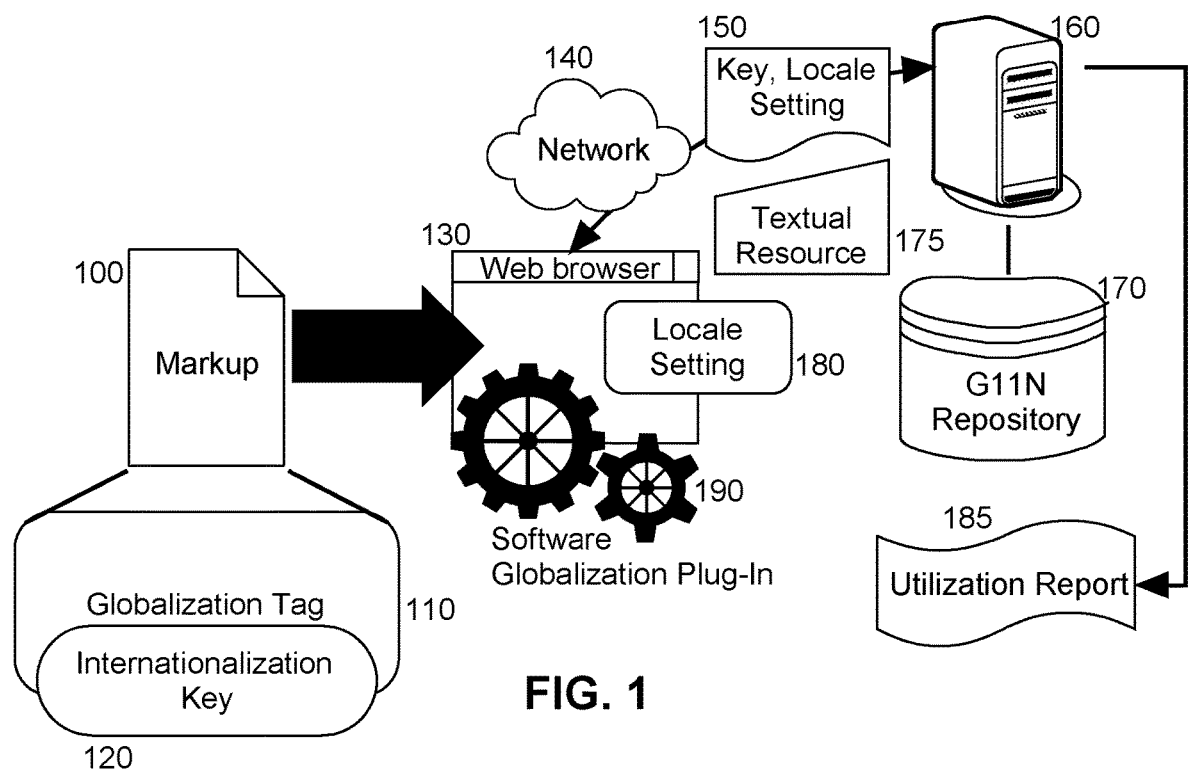
FIG. 1 is pictorial illustration of a process for software globalization management.

In further illustration, FIG. 1 pictorially shows a process for software globalization management. As shown in FIG. 1, Web browser 130 loads markup 100 for rendering therein. The markup 100 includes a portion specified by a globalization tag 110 referring to an internationalization key 120 in place of a textual resource 175 to be localized in accordance with a local setting 180 for the Web browser 130. By way of example, exemplary markup may appear as follows:

```
<form action="Logon" method="post">
    <div style="align: center" align="center">
        <table border="0" width="400px" cellpadding="0"
            cellspacing="0" style="font-size: 16px;">
            <tr>
                <td colspan="2" <g11n
                key="app.login.title"/></td>
            </tr>
            <tr>
                <td align="right" <g11n
                key="app.login.email"/></td>
                <td><input type="text" name="email"
                id="email"></td>
            </tr>
            <tr>
                <td align="right" <g11n
                key="app.login.pwd"/></td>
                <td><input type="text" name="pwd"
                id="pwd"></td>
            </tr>
            <tr>
                <td align="right" </td>
                <td>align="left">
                <input type="submit"><g11n
                key="app.login.button"></input>
                </td>
            </tr>
        </table>
    </div>
</form>
```

As can be seen, in the exemplary markup, four instances of a globalization tag refer differently to different internationalization keys.

Thereafter, a software globalization plug-in 190 to the Web browser 130 parses the markup 100 to identify the globalization tag 110. Alternatively, the software globalization plug-in 190 may be in the form of a separately executing service accessible through an API to direct the software globalization plug-in 190 to perform the foregoing parsing and hereafter described detection, extraction and transmission. In this regard, upon detecting the globalization tag 110 in the markup 100, the software globalization plug-in 190 extracts an internationalization key 120 associated with the globalization tag 110. The software globalization plug-in 190 then transmits over computer communications network 140 a request 150 to a remote server 160 that includes both the internationalization key 120 and the locale setting 180.

The remote server 160 responds to the request 150 by searching a globalization repository 170 for a textual resource 175 that is localized in accordance with the local setting 180 and corresponding to the internationalization key 120. The remote server 160 then returns the textual resource 175 to the software globalization plug-in 190 which includes the textual resource 175 in the markup 100 upon directing the Web browser 100 to render the markup 100. Optionally, the remote server 160 also includes a reference to the request 150 in a utilization report 185 indicating a frequency of requests for different textual resources in accordance with different locale settings. This report may be subsequently reviewed to determine which textual resources should be localized for which locale settings based upon a greatest frequency of requests.

Figure 2:
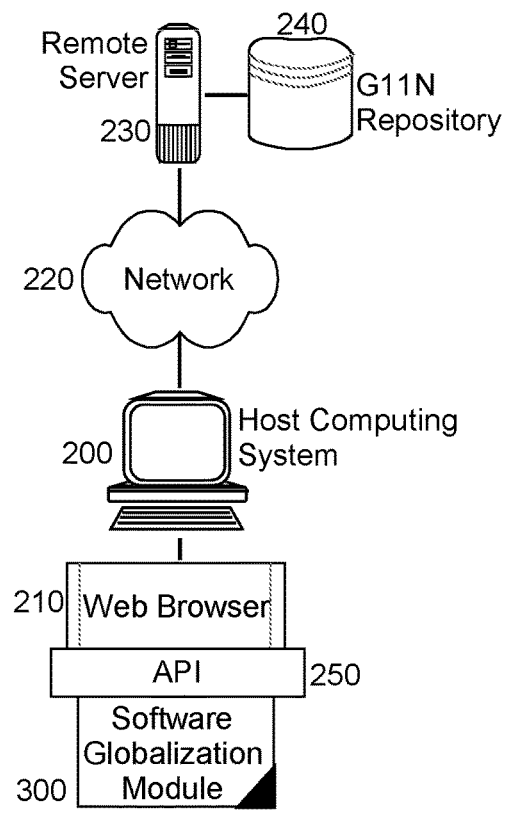
FIG. 2 is a schematic illustration of a data processing system configured for software globalization management; and, FIG. 3 is a flow chart illustrating a process for software globalization management.

The process described in connection with FIG. 1 may be implemented in a data processing system. In yet further illustration, FIG. 2 schematically shows a data processing system configured for software globalization management. The system includes a host computing system 200 that includes memory and at least one processor. A Web browser 210 operates in the host computing system 200 and is coupled to a remote server 230 by way of a computer communications network 220. The system also includes a software globalization module 300 executing in the memory of the host computing system 200.

The software globalization module 300 includes program code accessible through an API 250, that when executed in the memory of the host computing system 200 parses markup loaded for rendering in the Web browser 210 to identify one or more globalization tags disposed therein. Upon encountering a globalization tag, the program code of the software globalization module 300 extracts an internationalization key associated with the globalization tag and transmits a request over the computer communications network 220 to the remote server along with a locale setting for the Web browser 210. The request includes the extracted internationalization key.

The remote server 230, in response to the receipt of the request, searches for an entry in a coupled globalization repository 240 corresponding to the internationalization key of the request and the locale setting of the request. Optionally, the remote server 230 may first search a local cache for the entry in lieu of the globalization repository 240. Upon locating the entry, the remote server 230 returns the entry which includes a localized form of a textual resource to be rendered in the Web browser 210 in place of the markup language statement of the globalization tag. The program code of the software globalization module 300 then includes the received textual resource in the markup for rendering by the Web browser 210.

Figure 3:
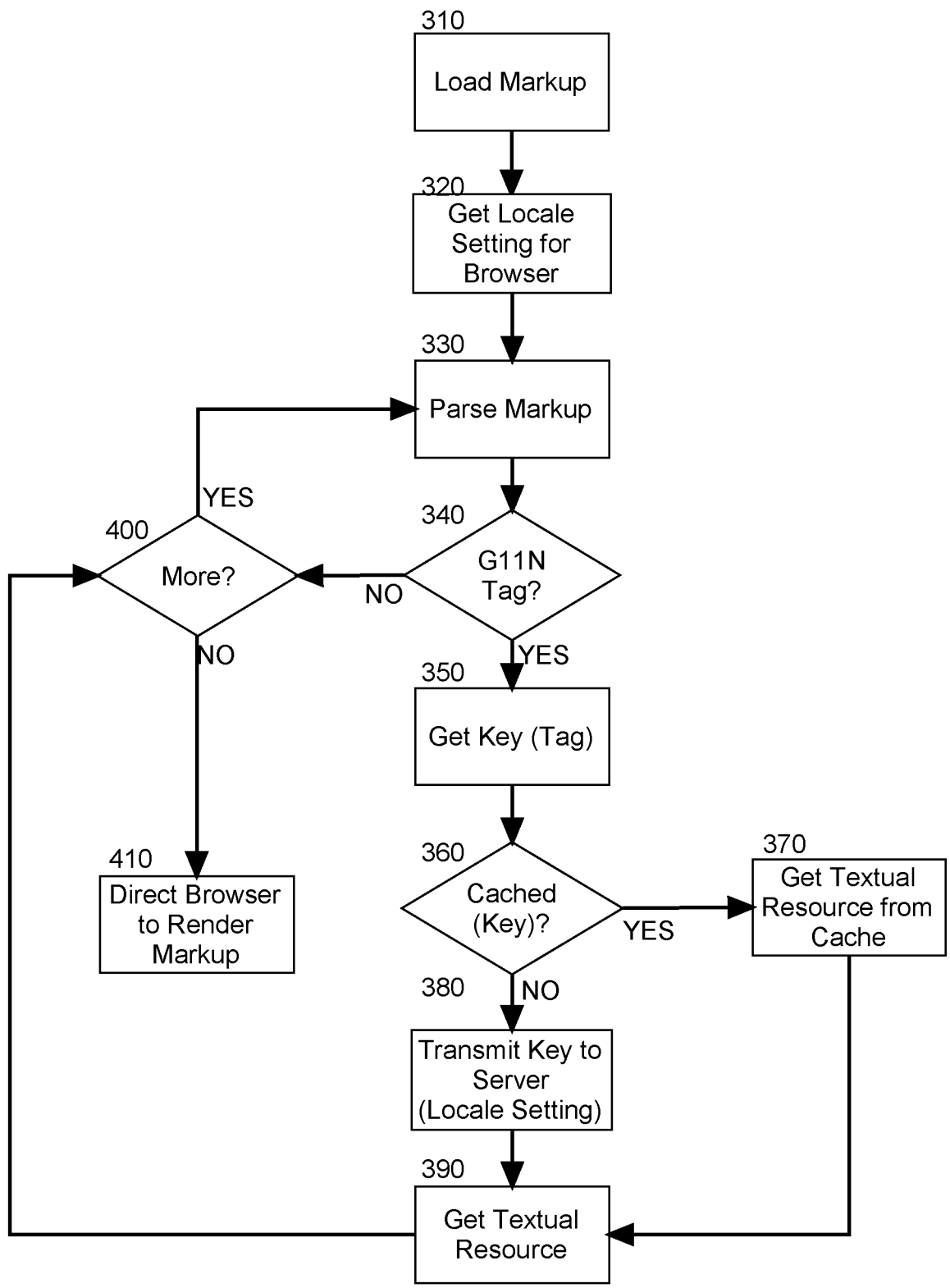

In even yet further illustration of the operation of the software globalization module 300, FIG. 3 is a flow chart illustrating a process for software globalization management. Beginning in block 310, software globalization module 300 loads markup for parsing and in block 320, software globalization module 300 retrieves a locale setting for the Web browser. In block 330 the software globalization module 300 parses the markup. In decision block 340, software globalization module 300 determines whether or not a globalization tag has been encountered. If so, in block 350 software globalization module 300 retrieves an internationalization key associated with the globalization tag.

In decision block 360, software globalization module 300 determined whether or not an entry exists in a local cache for the internationalization key. If so, in block 370, software globalization module 300 retrieves a corresponding textual resource from the cache. Otherwise, in block 380 software globalization module 300 transmits the internationalization key and the locale setting to a remote server in response to which in block 390, the software globalization module 300 receives the corresponding textual resource. In decision block 400, the software globalization module 300 determines if additional markup remains to be parsed. If so, the process repeats through block 330. Otherwise, in block 410 the software globalization module 300 directs the Web browser to render the markup with the retrieved textual resource.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for software globalization management comprising:
    loading markup in a browser for rendering in the browser;
    parsing the markup to identify different markup language tags disposed in the markup, the markup language tag denoted by a pair of brackets and providing an instruction disposed between the brackets; and,
    on condition that during the parsing of the markup, a globalization tag is detected amongst the different markup language tags, the globalization tag specifying a particular key, extracting from the globalization tag after an equality operator, an internationalization key associated with a textual resource, retrieving a locale setting for the browser, submitting the key to remote repository with the locale setting in order to retrieve therefrom a translated form of the textual resource in accordance with the locale setting, receiving in response to the requesting the translated form of the textual resource, rendering the markup with the translated form of the textual resource and generating a utilization report including a reference to the request and indicating a frequency of requests for different textual resources in accordance with different locale settings.

2. The method of claim 1, wherein the globalization tag is detected by a globalization agent coupled to the browser as a plug-in to the browser.

3. The method of claim 1, wherein the globalization tag is detected by a globalization agent in response to a call to a method exposed by an application programming interface (API) to the globalization agent.

4. The method of claim 1, wherein the translated form of the textual resource is retrieved from a cache coupled to the browser in lieu of the remote repository.

5. The method of claim 1, further comprising generating a utilization report in response to each request for a translated form of a textual resource.

6. A data processing system configured for software globalization management, the system comprising:
    a host computing system comprising memory and at least one processor;
    a Web browser executing in the memory of the host computing system; and,
    a software globalization module coupled to the Web browser, the module comprising program code enabled upon execution in the memory of the host computing system to parse markup loaded in the Web browser to identify different markup language tags disposed in the markup, the markup language tag denoted by a pair of brackets and providing an instruction disposed between the brackets, and on condition that during the parsing of the markup, a globalization tag is detected amongst the different markup language tags, the globalization tag specifying a particular key, extracting from the globalization tag after an equality operator, an internationalization key associated with a textual resource, retrieve a locale setting for the browser, submit the key over a computer communications network to remote repository with the locale setting in order to retrieve therefrom a translated form of the textual resource in accordance with the locale setting, receive in response to the requesting the translated form of the textual resource, direct the Web browser to render the markup with the translated form of the textual resource and generate a utilization report including a reference to the request and indicating a frequency of requests for different textual resources in accordance with different locale settings.

7. The system of claim 6, wherein the module is coupled to the Web browser as a plug-in to the Web browser.

8. The system of claim 6, wherein the globalization tag is detected by the module in response to a call to a method exposed by an application programming interface (API) to the module.

9. The system of claim 6, wherein the translated form of the textual resource is retrieved from a cache coupled to the browser in lieu of the remote repository.

10. The system of claim 6, wherein the program code is further enabled to generate a utilization report in response to each request for a translated form of a textual resource.

11. A computer program product for software globalization management, the computer program product comprising a computer readable storage medium having program instructions embodied therewith, wherein the computer readable storage medium is not a transitory signal per se, the program instructions executable by a device to cause the device to perform a method comprising:
    loading markup in a browser for rendering in the browser;
    parsing the markup to identify different markup language tags disposed in the markup, the markup language tag denoted by a pair of brackets and providing an instruction disposed between the brackets; and,
    on condition that during the parsing of the markup, a globalization tag is detected amongst the different markup language tags, the globalization tag specifying a particular key, extracting from the globalization tag after an equality operator, an internationalization key associated with a textual resource, retrieving a locale setting for the browser, submitting the key to remote repository with the locale setting in order to retrieve therefrom a translated form of the textual resource in accordance with the locale setting, receiving in response to the requesting the translated form of the textual resource, rendering the markup with the translated form of the textual resource and generating a utilization report including a reference to the request and indicating a frequency of requests for different textual resources in accordance with different locale settings.

12. The computer program product of claim 11, wherein the globalization tag is detected by a globalization agent coupled to the browser as a plug-in to the browser.

13. The computer program product of claim 11, wherein the globalization tag is detected by a globalization agent in response to a call to a method exposed by an application programming interface (API) to the globalization agent.

14. The computer program product of claim 11, wherein the translated form of the textual resource is retrieved from a cache coupled to the browser in lieu of the remote repository.

15. The computer program product of claim 11, wherein the method further comprises generating a utilization report in response to each request for a translated form of a textual resource.

* * * * *